(12) United States Patent
Niizuma

(10) Patent No.: US 9,248,475 B2
(45) Date of Patent: Feb. 2, 2016

(54) FOREIGN MATTER REMOVAL MECHANISM

(71) Applicant: IHI Corporation, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 14/597,719

(22) Filed: Jan. 15, 2015

(65) Prior Publication Data

US 2015/0128362 A1    May 14, 2015

Related U.S. Application Data

(63) Continuation of application No. PCT/JP2013/068844, filed on Jul. 10, 2013.

(30) Foreign Application Priority Data

Jul. 27, 2012 (JP) ................. 2012-167459

(51) Int. Cl.
| | |
|---|---|
| *A63G 25/00* | (2006.01) |
| *B08B 1/00* | (2006.01) |
| *H02J 7/00* | (2006.01) |
| *H02J 17/00* | (2006.01) |
| *B60L 11/18* | (2006.01) |
| *H02J 7/02* | (2006.01) |

(52) U.S. Cl.
CPC .............. *B08B 1/008* (2013.01); *B60L 11/182* (2013.01); *B60L 11/1824* (2013.01); *B60L 11/1829* (2013.01); *H02J 7/00* (2013.01); *H02J 7/0027* (2013.01); *H02J 7/025* (2013.01); *H02J 17/00* (2013.01)

(58) Field of Classification Search
CPC .............. B60L 2200/26; A63G 25/00
USPC ............................... 180/2.1; 320/2, 5
See application file for complete search history.

(56) References Cited

U.S. PATENT DOCUMENTS

| | | | | |
|---|---|---|---|---|
| 4,368,554 A | * | 1/1983 | Mealing et al. .............. | 15/354 |
| 4,506,405 A | * | 3/1985 | Block .......................... | 15/320 |
| 5,983,442 A | * | 11/1999 | Louis et al. .................. | 15/320 |
| 6,131,237 A | * | 10/2000 | Kasper et al. ................ | 15/320 |

FOREIGN PATENT DOCUMENTS

| | | |
|---|---|---|
| JP | 09-102329 A | 4/1997 |
| JP | 2010-226946 A | 10/2010 |
| JP | 2012-085472 A | 4/2012 |

OTHER PUBLICATIONS

International Search Report, PCT/JP2013/068844, Date of Mailing: Sep. 10, 2013, 1 pg. (English translation), 2 pgs. (Japanese Language), 3 pgs. total.

* cited by examiner

*Primary Examiner* — John Walters
*Assistant Examiner* — James Triggs
(74) *Attorney, Agent, or Firm* — Volpe and Koenig, P.C.

(57) ABSTRACT

A foreign matter removal mechanism for removing foreign matter on a power-supplying coil that wirelessly supplies power to a parked vehicle from below, including: a movable unit that is pushed by the vehicle to move horizontally; and a movable cleaning unit that is coupled to the movable unit and moves, in conjunction with a movement of the movable unit, along an upper surface of the power-supplying coil.

6 Claims, 11 Drawing Sheets

FOREIGN MATTER REMOVAL MECHANISM

This application is a continuation application based on a PCT Patent Application No. PCT/JP2013/068844, filed Jul. 10, 2013, whose priority is claimed on Japanese Patent Application No. 2012-167459, filed Jul. 27, 2012. The contents of both the PCT application and the Japanese Patent Application are incorporated herein by reference.

TECHNICAL FIELD

The present invention relates to a foreign matter removal mechanism.

BACKGROUND ART

Patent Document 1 below discloses a wireless power-supplying system wherein an insulating separation material is provided in the space between a power-receiving unit provided in a bottom surface of a vehicle and a power-supplying unit buried in a parking space, wherein the separation material is stored under ground except when electric power is supplied, and wherein, when electric power is supplied, the separation material is moved to the space between the power-receiving unit and the power-supplying unit by use of a movable unit, to thereby prevent foreign matter from intruding into the space between the power-receiving unit and the power-supplying unit. Furthermore, Patent Document 2 below discloses a charging device for a vehicle that is provided with a foreign matter removal mechanism made of: a cone section provided on a power-supplying coil; a through-hole that discharges the garbage sliding down on the slope of the cone; and a motor that vibrates the cone.

DOCUMENT OF RELATED ART

Patent Document

Patent Document 1: Japanese Unexamined Patent Application, First Publication No. 2010-226946
Patent Document 2: Japanese Unexamined Patent Application, First Publication No. 2012-85472

SUMMARY OF INVENTION

Technical Problem

However, Patent Document 1 as described above has a problem in that, if foreign matter is already present on the power-supplying coil, it is not possible to remove the foreign matter. The foreign matter removal mechanism of Patent Document 2 as described above leads to increased cost in manufacturing because it is necessary to provide a drive source that generates a vibration such as a motor in order to remove foreign matter.

The present invention is conceived in view of the above-described circumstances, and has objects as follows:
(1) To be capable of removing foreign matter.
(2) To make it unnecessary to provide a drive source that generates a vibration such as a motor.

Solution to Problem

To achieve the above objects, a first aspect of a foreign matter removal mechanism of the present invention is a foreign matter removal mechanism for removing foreign matter on a power-supplying coil that wirelessly supplies power to a parked vehicle from below, including: a movable unit that is pushed by the vehicle to move horizontally; and a movable cleaning unit that is coupled to the movable unit and moves, in conjunction with a movement of the movable unit, along an upper surface of the power-supplying coil.

A second aspect of the present invention is a foreign matter removal mechanism according to the first aspect, including: a foreign matter receiving ditch that is provided on a far side of the power-supplying coil in a moving direction of the movable cleaning unit.

A third aspect of the present invention is a foreign matter removal mechanism according to the first or second aspect, including: a movable frame body that is fixed to the movable cleaning unit from an opposite side of the movable unit and moves, in conjunction with the movement of the movable unit, along a parking surface on which the vehicle is parked; and a second foreign matter receiving ditch that is provided on a near side of the power-supplying coil in the moving direction of the movable cleaning unit.

A fourth aspect of the present invention is a foreign matter removal mechanism according to any one of the first to third aspects, including: a stopper provided on the far side of the power-supplying coil in the moving direction of the movable cleaning unit.

A fifth aspect of the present invention is a foreign matter removal mechanism according to any one of the first to fourth aspects, including: a coil spring that connects between the movable unit and the movable cleaning unit.

A sixth aspect of the present invention is a foreign matter removal mechanism according to any one of the first to fifth aspects, including: a second stopper that is provided on the near side of the power-supplying coil in the moving direction of the movable cleaning unit; and a second coil spring that biases the movable cleaning unit in a direction opposite to the moving direction of the movable cleaning unit.

Effects of the Invention

According to the present invention, with the movable cleaning unit moving along the upper surface of the power-supplying coil, it is possible to remove the foreign matter on the power-supplying coil. Furthermore, according to the present invention, it is possible to utilize the pushing force from the vehicle to remove the foreign matter on the power-supplying coil. This eliminates the necessity of providing a drive source that generates a vibration such as a motor.

DESCRIPTION OF EMBODIMENTS

Hereunder is a description of an embodiment of the present invention with reference to the drawings.

Figure 1:
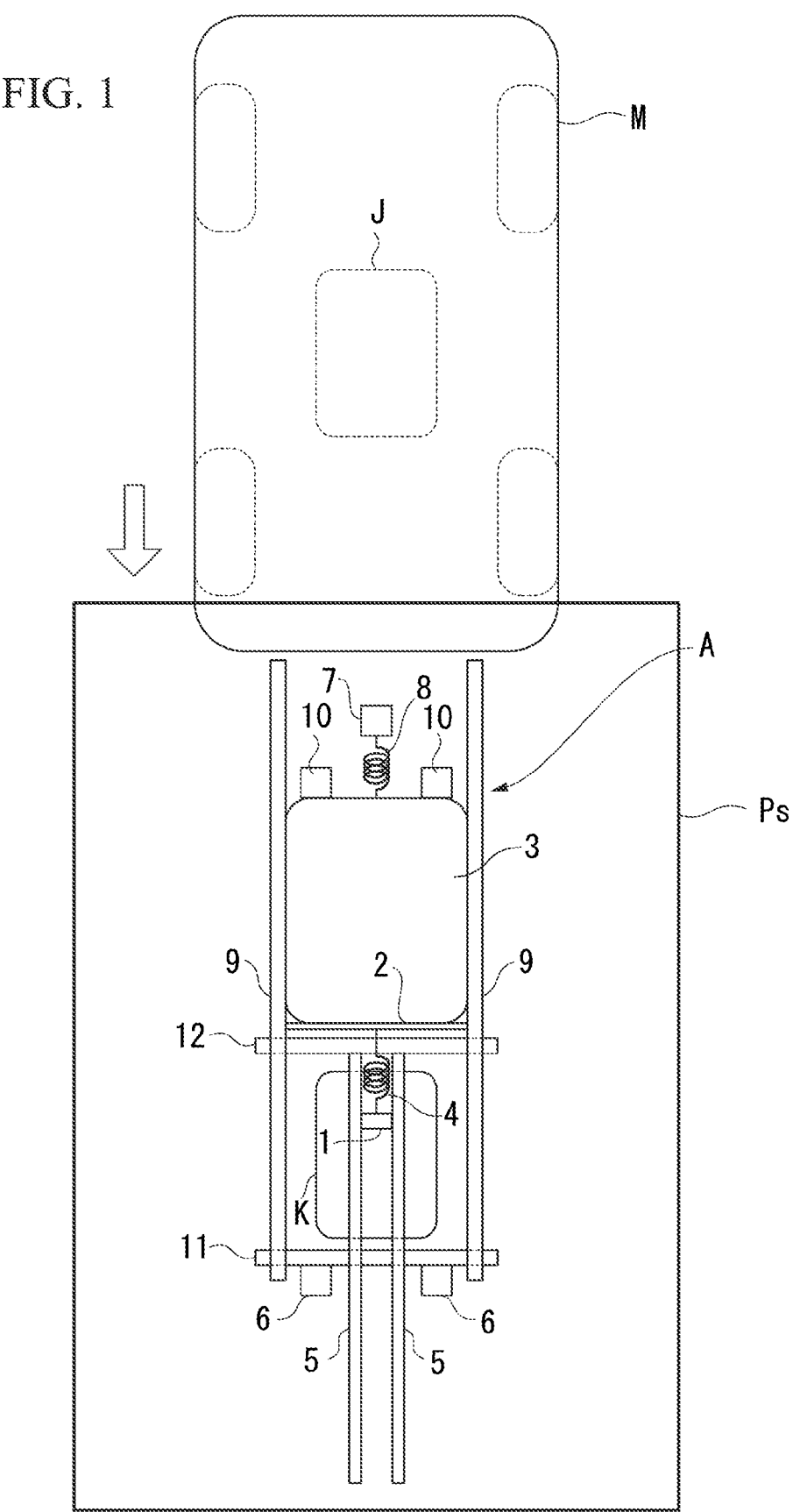
FIG. 1 is a front view showing a rough structure of a foreign matter removal mechanism according to an embodiment of the present invention.
Figure 2:
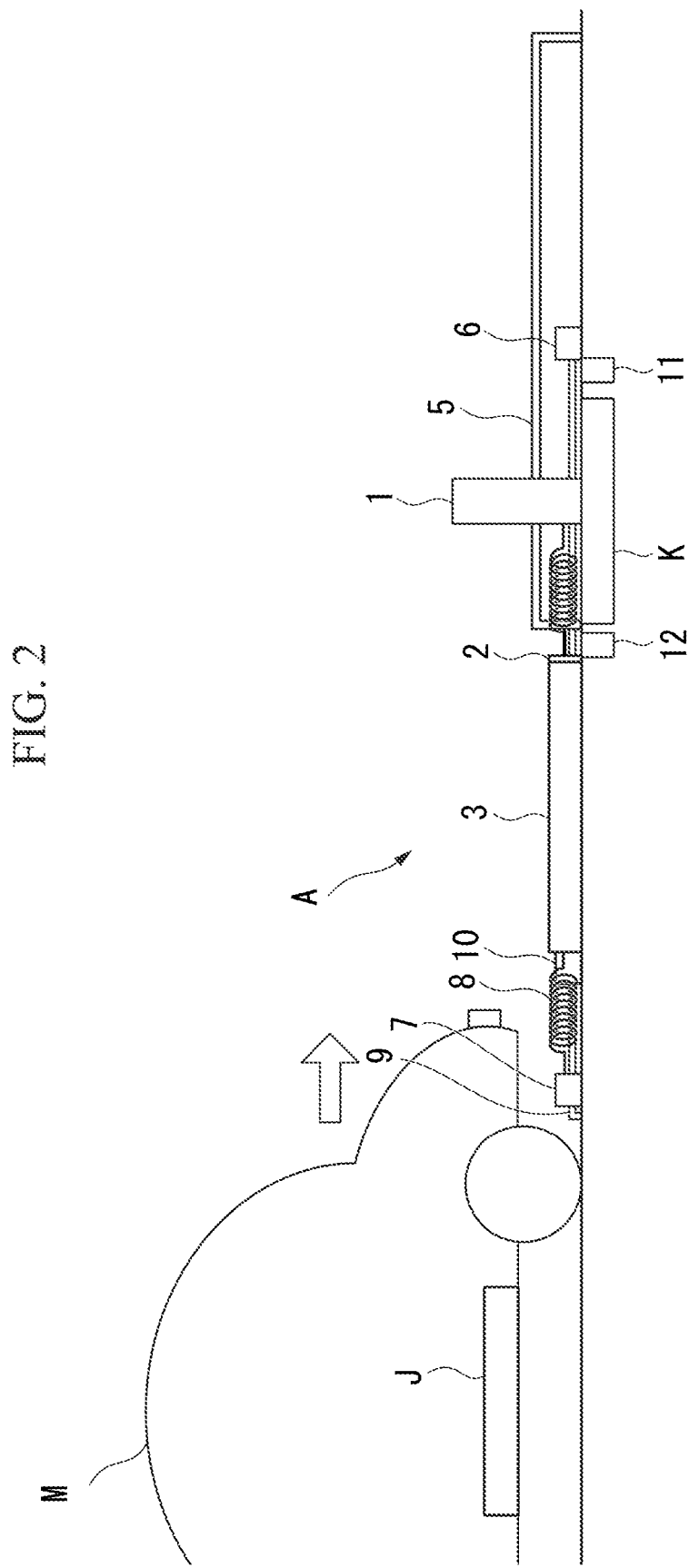
FIG. 2 is a cross-sectional view showing the rough structure of the embodiment of the present invention.

A foreign matter removal mechanism A according to the present embodiment is made of: a movable unit 1; a movable cleaning unit 2; a movable frame body 3; a first coil spring 4; first guide rails 5; first stoppers 6; a spring fixation unit 7; a second coil spring 8; second guide rails 9; second stoppers 10, a first foreign matter receiving ditch 11; and a second foreign matter receiving ditch 12, as shown in FIG. 1 and FIG. 2.

As shown in FIG. 1, the foreign matter removal mechanism A is provided in each parking space Ps for a vehicle of a parking lot or the like, and removes foreign matter present on a power-supplying coil K that is buried in the ground surface (parking surface) of the parking space Ps. Namely, the foreign matter removal mechanism A removes foreign matter on the power-supplying coil K, which supplies electric power wirelessly to a power-receiving coil J of a vehicle M parked in the parking space Ps.

The parking spaces Ps are, for example, rectangular areas provided in a parking lot of a shopping center, each of which is large enough to allow a vehicle M to be parked. As shown in FIG. 1, the parking space Ps has one of a pair of short sides used as an entrance (exit) for the vehicle M. The vehicle M enters the parking space Ps at the entrance (exit) and exits the parking space Ps to the outside at the entrance (exit).

The vehicle M charges a rechargeable battery with the electric power that the power-receiving coil J has received wirelessly from the power-supplying coil K, and also utilizes the electric power charged in the rechargeable battery as a power source of a motor for traveling. The vehicle M is an electric vehicle or a hybrid vehicle that travels with the wheels driven by the motor. The vehicle M is provided with a bumper in its front and rear sections. The power-receiving coil J is a helical coil with a predetermined coil diameter. The power-receiving coil J is provided in a bottom section of the vehicle M and the coil axis is in a vertical direction. The power-receiving coil J has substantially the same coil diameter as that of the power-supplying coil K, which is a ground facility. The power-receiving coil J is coupled electromagnetically to the power-supplying coil K, to thereby wirelessly receive power with an alternating current.

Figure 3:
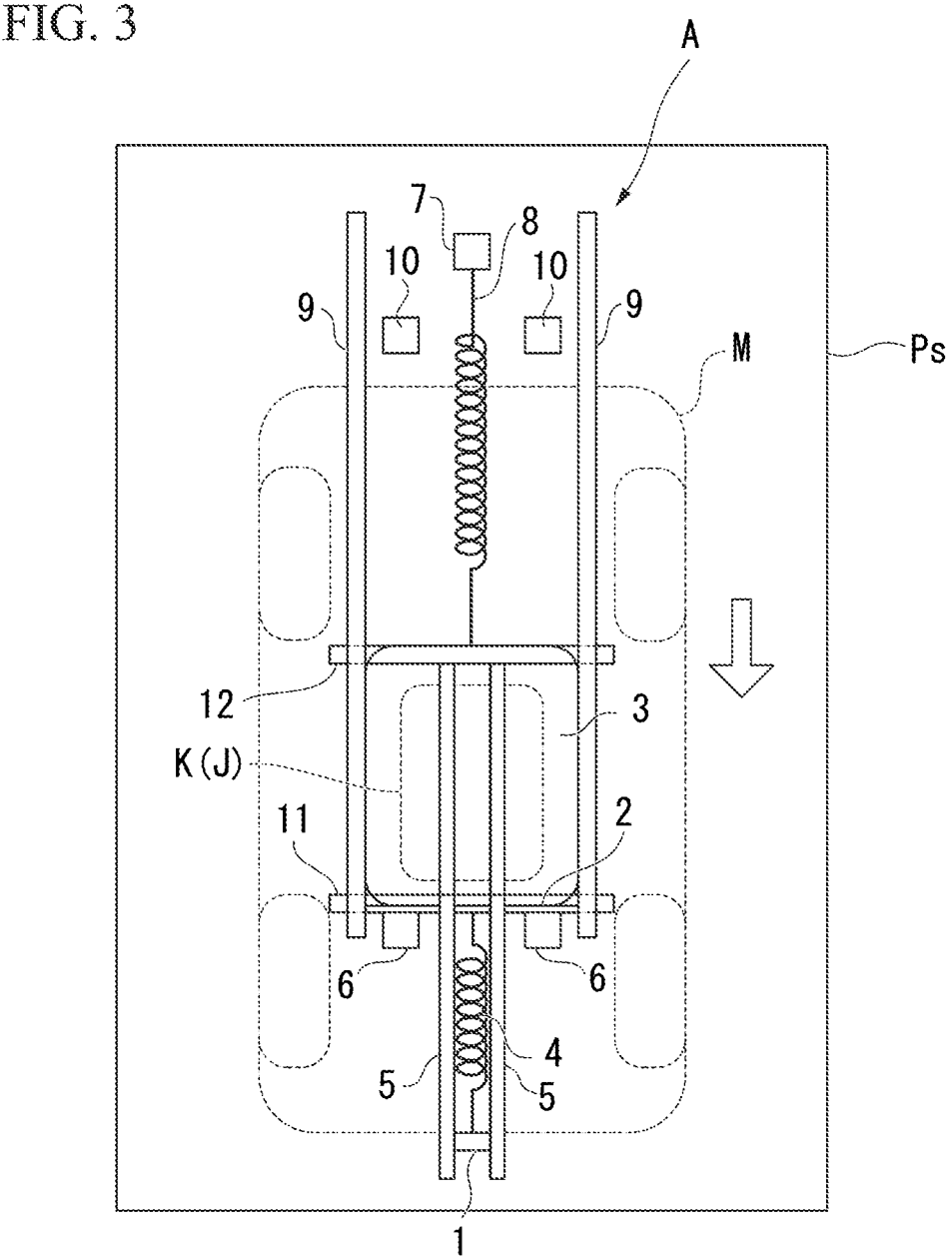
FIG. 3 is a front view showing a rough structure of the embodiment of the present invention after a removal operation of foreign matter.
Figure 4:
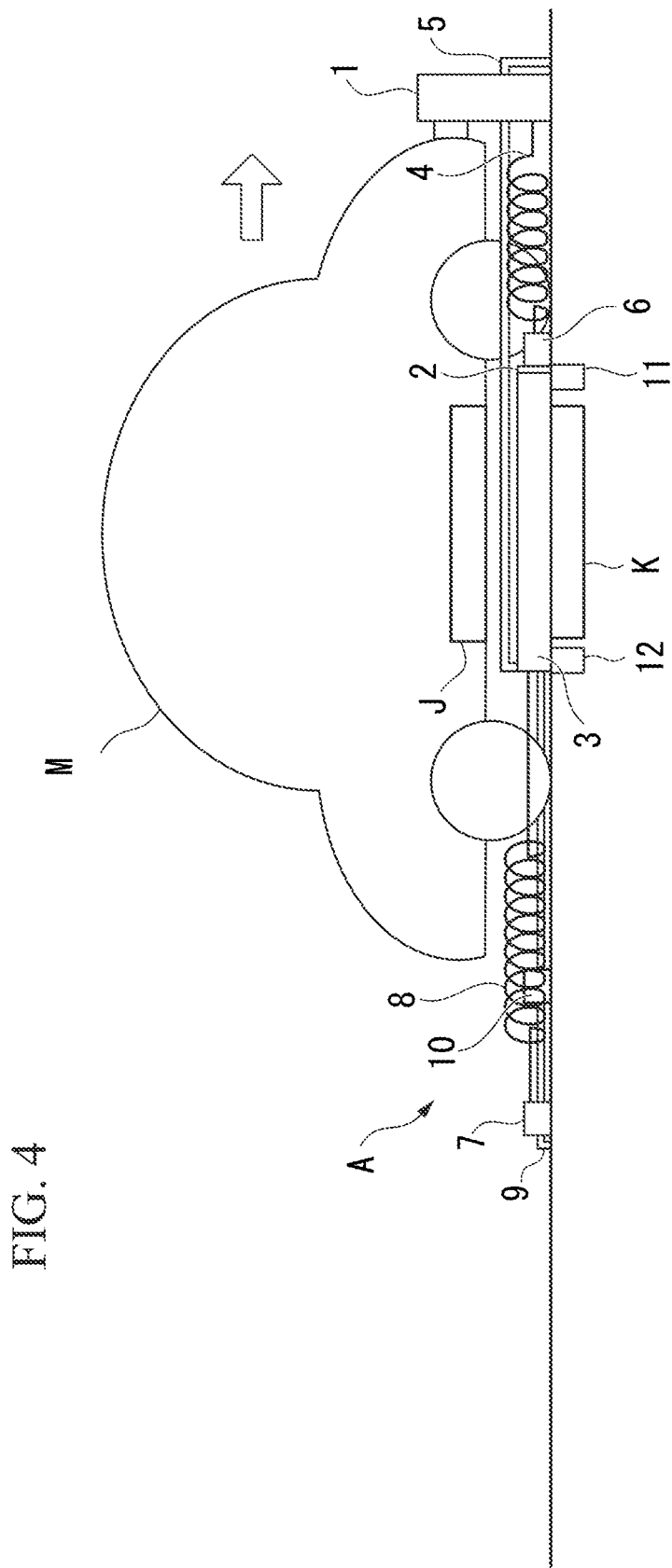
FIG. 4 is a cross-sectional view showing the rough structure of the embodiment of the present invention after removal operation of foreign matter.

As shown in FIG. 1 and FIG. 2, the movable unit 1 is a member formed into a rectangular column, which is arranged so that its height direction is along the vertical direction with respect to the around surface of the parking space Ps. The movable unit 1 is held by being sandwiched from both sides between the pair of first guide rails 5, which are provided along a length direction of the parking space Ps. Furthermore, the movable unit 1 has such a height that it contacts with a rear section (for example, a bumper) of the vehicle M entering the parking space Ps. As shown in FIG. 3 and FIG. 4, when pushed away from an entrance by the rear section of the vehicle M entering the parking space Ps, this movable unit 1 is guided by the first guide rails 5 to move horizontally in a direction opposite to the entrance.

The movable cleaning unit 2 is made of a rectangular plate material. It is a blade member arranged so that its length direction is along a width direction of the parking space Ps and so that its lower edge is set to have the same height as that of an upper surface of the power-supplying coil K. The movable cleaning unit 2 has a length with which, when guided by the second guide rails 9 to move as will be described later, the movable cleaning unit 2 is capable of cleaning a whole upper surface of the power-supplying coil K, namely, a whole area through which an electromagnetic field passes as electric power is wirelessly supplied from the power-supplying coil K to the power-receiving coil J. The movable cleaning unit 2 is held by being sandwiched from both ends between the pair of second guide rails 9, which are provided along the length direction of the parking space Ps. The movable cleaning unit 2 is connected to the movable unit 1 by means of the first coil spring 4. Furthermore, the movable cleaning unit 2 has such a height that its upper edge will not contact with the bottom section of the vehicle M.

As shown in FIG. 3 and FIG. 4, with the movable unit 1 being pushed by the vehicle M in the direction opposite to the entrance of the parking space Ps, this movable cleaning unit 2 is pulled by the movable unit 1 via the first coil spring 4. As a result, while being guided by the second guide rails 9, the movable cleaning unit 2 slides horizontally along the upper surface of the power-supplying coil K. Note that the movable cleaning unit 2 does not have to be formed into a blade, but may have a lower edge in a brush-like shape.

The movable frame body 3 has a cross-section seen from above in a rectangular ring (hollow cylinder) shape. A first side (a side closer to the first stoppers 6) thereof is fixed to the movable cleaning unit 2 from the side opposite to the movable unit 1, and a pair of sides (a pair of sides parallel to the second guide rails 9) thereof are held by being sandwiched between the second guide rails 9. The movable frame body 3 is made as high as possible as far as it will not contact with the bottom surface of the vehicle M. As shown in FIG. 3 and FIG. 4, with the movable unit 1 being pushed by the vehicle M to be moved in the direction opposite to the entrance of the parking space Ps, this movable frame body 3 is pulled by the movable unit 1 via the first coil spring 4. As a result, while being guided by the second guide rails 9, the movable frame body 3 slides horizontally along the ground surface of the parking space Ps. As for the movable frame body 3, its top portion may be arranged with a brush-like material or a soft material, so that its contact with the bottom surface of the vehicle M will be softened.

The first coil spring 4 is an elastic member whose first end is fixed to the movable unit 1 and whose second end is fixed to the movable cleaning unit 2. The first coil spring 4 is arranged along the length direction of the parking space Ps, and is set at a height that it will not contact with the bottom surface of the vehicle M. This first coil spring 4 connects the movable cleaning unit 2 to the movable unit 1, to thereby couple the movable cleaning unit 2 to the movable unit 1.

In the present embodiment, the first guide rails 5 are installed on the upper surface of the power-supplying coil K. Therefore, to prevent a decrease in the efficiency of wireless power supply, the first guide rails 5 are made of plastic, FRP (Fiber Reinforced Plastic), or the like, which allows an electromagnetic field to pass through, namely, which is non-magnetic and non-conductive. The first guide rails 5 are a pair of rails that guide the movable unit 1. The first guide rails 5 are provided on the ground surface of the parking space Ps along the length direction of the parking space Ps, and are positioned at a height that it will not contact with the bottom surface of the vehicle M. It is possible for the movable unit 1 to move reciprocally while being guided by the first guide rails 5.

The first stoppers 6 are stoppers dedicated to the movable cleaning unit 2. When the movable cleaning unit 2 is moved by the pull from the movable unit 1 via the first coil spring 4, the first stoppers 6 restrict the movable cleaning unit 2 to a specific position. With its hitting the first stoppers 6, the movable cleaning unit 2 stops moving. At this time, the first stoppers 6 determine a position of the movable frame body 3, which moves integrally with the movable cleaning unit 2. Namely, the first stoppers 6 also have a function of stopping the movable frame body 3 at a position where the movable frame body 3 surrounds the upper surface of the power-supplying coil K.

The spring fixation unit 7 is installed on the ground surface of the parking space Ps near its entrance, and fixes a first end of the second coil spring 8.

The second coil spring 8 is an elastic member whose first end is fixed to the spring fixation unit 7 and whose second end is fixed to the movable frame body 3. The second coil spring 8 is arranged along the length direction of the parking space Ps, and is installed at a height that it will not contact with the bottom surface of the vehicle M. The second coil spring 8 connects the movable frame body 3 to the spring fixation unit 7, to thereby bias (apply a force to) the movable cleaning unit 2 and the movable frame body 3 in the direction opposite to the direction in which the movable cleaning unit 2 and the movable frame body 3 have moved by the pull from the movable unit 1.

The second guide rails 9 are a pair of rails that guide the movable cleaning unit 2 and the movable frame body 3. The second guide rails 9 are provided on the ground surface of the parking space Ps and run by the sides of the power-supplying coil K along the length direction of the parking space Ps. The second guide rails 9 are positioned at a height so that they will not contact with the bottom surface of the vehicle M. It is possible for the movable cleaning unit 2 and the movable frame body 3 to move reciprocally while being guided by the second guide rails 9.

The second stoppers 10 are stoppers dedicated to the movable frame body 3. The second stoppers 10 restrict the movable frame body 3, which is biased by the second coil spring 8, to a specific position. With the movable frame body 3 hitting the second stoppers 10, the movable cleaning unit 2 and the movable frame body 3 stop their movements by the biasing force from the second coil spring 8.

The first foreign matter receiving ditch 11 is a ditch that extends in the same direction as that of the length direction of the movable cleaning unit 2. The first foreign matter receiving ditch 11 is in parallel with the movable cleaning unit 2, and faces the movable cleaning unit 2. The first foreign matter receiving ditch 11 is arranged on a far side of the power-supplying coil K in the direction in which the movable cleaning unit 2 is moved by the pull from the movable unit 1. When the movable cleaning unit 2 slides on the upper surface of the power-supplying coil by the pull from the movable unit 1 via the first coil spring 4, the first foreign matter receiving ditch 11 receives foreign matter such as garbage removed from the upper surface of the power-supplying coil.

The second foreign matter receiving ditch 12 is a ditch that extends in the same direction as that of the length direction of the first foreign matter receiving ditch 11. The second foreign matter receiving ditch 12 is provided on a near side of the power-supplying coil K in the direction in which the movable cleaning unit 2 is moved by the pull from the movable unit 1. When the movable frame body 3 slides on the ground surface of the parking space Ps by the pull from the movable unit 1 via the first coil spring 4, the second foreign matter receiving ditch 12 receives foreign matter removed from the ground surface.

A detailed description of working and effect of the foreign matter removal mechanism A with the above-described structure will be given below, with reference to FIG. 5A, FIG. 5B, and FIG. 5C. Note that the following description will be for the case where the vehicle M rolls backward to enter and park in the parking space Ps.

When trying to park the vehicle M in the parking space Ps, a driver drives the vehicle M backward to cause the vehicle M to enter the parking space Ps at the entrance of the parking space Ps. When the vehicle M rolls straightly backward into the parking space Ps at the entrance, the bumper contacts with the movable unit 1.

In the foreign matter removal mechanism A, when the vehicle M enters the parking space Ps in this manner in order to park, the movable unit 1 contacts with and pushed by the vehicle M as shown in FIG. 3 and FIG. 4. The movable unit 1 is then guided by the first guide rails to move horizontally in the direction opposite to the entrance. As a result, the movable cleaning unit 2 is pulled by the movable unit 1 via the first coil spring 4. Therefore, the movable cleaning unit 2 slides horizontally along the upper surface of the power-supplying coil K while being guided by the second guide rails 9. Similarly, together with the movable cleaning unit 2, the movable frame body 3 is also pulled by the movable unit 1 via the first coil spring 4. Therefore, the movable frame body 3 slides horizontally along the ground surface of the parking space Ps while being guided by the second guide rails 9.

Figure 5A:
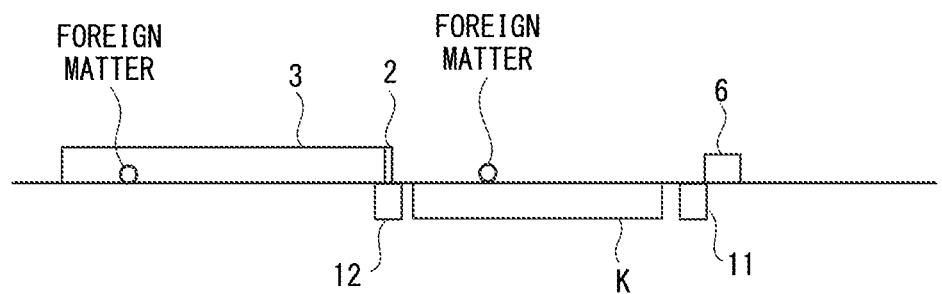
FIG. 5A is a schematic diagram showing working and effect of the embodiment of the present invention.
Figure 5B:
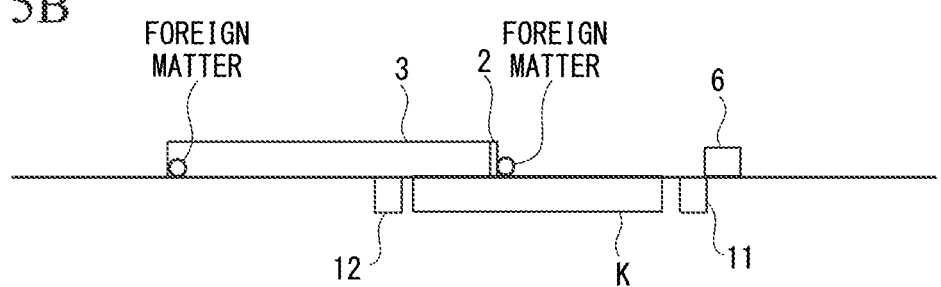
FIG. 5B is a schematic diagram showing the working and effect of the embodiment of the present invention.
Figure 5C:
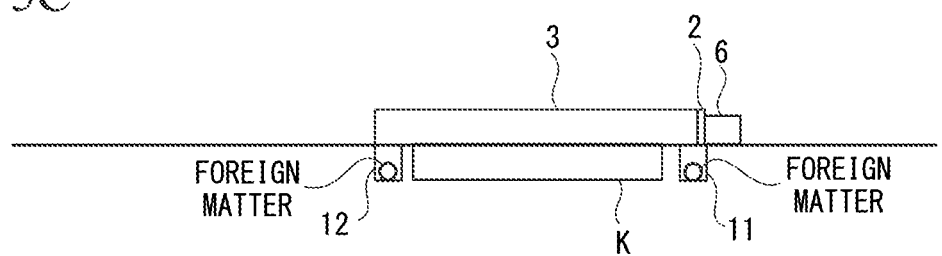
FIG. 5C is a schematic diagram showing the working and effect of the embodiment of the present invention.

Suppose that, before the vehicle M enters the parking space Ps, foreign matter is present on the power-supplying coil K and also that another foreign matter is present on the ground surface in the movable frame body 3, as shown in FIG. 5A. When the vehicle M starts to push the movable unit 1 after entering the parking space Ps, the movable cleaning unit 2, while being moved, moves the foreign matter on the power-supplying coil K toward the first foreign matter receiving ditch 11, as shown in FIG. 5B. On the other hand, the movable frame body 3, while being moved, moves the foreign matter on the ground surface in the movable frame body 3 toward the second foreign matter receiving ditch 12. After that, when the movable cleaning unit 2 hits the first stoppers 6, the movements of the movable cleaning unit 2 and the movable frame body 3 stop. Then, as is shown in FIG. 5C, the foreign matter on the power-supplying coil K is received in the first foreign matter receiving ditch 11 while the foreign matter on the ground surface in the movable frame body 3 is received in the second foreign matter receiving ditch 12. At this time, the movable cleaning unit 2 is located at a position outside the upper surface of the power-supplying coil K; the movable frame body 3 is located at a position that surrounds the upper surface of the power-supplying coil; and the power-receiving coil J of the vehicle M is above the power-supplying coil K, namely, at a position in which electromagnetic coupling is produced to make wireless power supply available.

After that, in the case of starting the vehicle M from the parking space Ps, the driver drives the vehicle M forward to cause the vehicle M to exit the parking space Ps of the parking space Ps at the exit (entrance), the bumper moves away from the movable unit 1.

In the case of the foreign matter removal mechanism A, when the vehicle M exits from the parking space Ps in this manner after parking, the pull of the movable cleaning unit 2 and the movable frame body 3 by the movable unit 1 is released. Therefore, the movable cleaning unit 2 and the movable frame body 3 are moved in the direction of the spring fixation unit 7 by a biasing force of the second coil spring 8. Then, with the movable frame body 3 hitting the second stoppers 10, the movable cleaning unit 2 and the movable frame body 3 stop the movements by the biasing force of the second coil spring 8 to return to the default positions, as shown in FIG. 1 and FIG. 2.

According to this embodiment, with the movable cleaning unit 2 moving along the upper surface of the power-supplying coil K, it is possible to remove the foreign matter on the power-supplying coil K. Furthermore, according to the embodiment, it is possible to utilize the pushing force from the vehicle M to remove the foreign matter on the power-supplying coil K. This eliminates the necessity of providing a drive source that generates a vibration such as a motor. Furthermore, according to the embodiment, the foreign matter around the power-supplying coil K is removed into the second foreign matter receiving ditch 12 by the movable frame body 3 together with the movable cleaning unit 2. Therefore, it is possible to prevent the foreign matter around the power-supplying coil K from being moved to the power-supplying coil K. In addition, in a state with the foreign matter inside the movable frame body 3 being removed, the movable frame body 3 surrounds the upper surface of the power-supplying coil K, and the space above the movable frame body 3 is covered with the bottom surface of the vehicle M. This prevents new foreign matter from intruding into the upper surface of the power-supplying coil K.

The present invention is not limited to the above-mentioned embodiment, and for instance the following variant examples are conceivable:

(1) In the above-mentioned embodiment, the movable cleaning unit 2 slides along the upper surface of the power-supplying coil K. However, instead of being in contact with the power-supplying coil K, the lower edge of the movable cleaning unit 2 may be in a suspended state above the power-supplying coil K, the clearance corresponding to the anticipated size of the foreign matter. Similarly, the movable frame body 3 may be in a suspended state above the ground surface of the parking space Ps.

(2) In the above-mentioned embodiment, the first foreign matter receiving ditch 11 is for receiving the foreign matter having been removed from the upper surface of the power-supplying coil K by the movable cleaning unit 2. Therefore, if only the foreign matter on the power-supplying coil K is to be removed by the movable cleaning unit 2, it is not necessarily required to install the first foreign matter receiving ditch 11. This is also true of the movable frame body 3 and the second foreign matter receiving ditch 12, which are installed for receiving the foreign matter around the power-supplying coil K, and are not necessarily required to be installed. In the case where the movable frame body 3 is not installed, the second coil spring 8 may be fixed to the movable cleaning unit 2 instead of fixed to the movable frame body 3.

(3) In the above-mentioned embodiment, the second stoppers 10 are for limiting the range of the reciprocal movements of the movable cleaning unit 2 and the movable frame body 3, and are not necessarily required to be installed.

(4) In the above-mentioned embodiment, the movable cleaning unit 2 is coupled to the movable unit 1 by the first coil spring 4. However, instead of the first coil spring 4, anything such as a rope may be used for the coupling so long as, in conjunction with the movement of the movable unit 1, it moves the movable cleaning unit 2. Furthermore, the second coil spring 8 is used to return the movable cleaning unit 2 and the movable frame body 3 to their default positions after they are moved by the pull from the movable unit 1. However, so long as the movable cleaning unit 2 and the movable frame body 3 are returned to their default positions by use of another means, the second coil spring 8 is not necessarily required to be installed.

(5) In the above-mentioned embodiment, the movable unit 1 is guided by the first guide rails 5 while the movable cleaning unit 2 and the movable frame body 3 are guided by the second guide rails 9. However, instead of these guide rails, sliding rollers may be used to make the movements of the movable cleaning unit 2 and the movable frame body 3 possible.

(6) The vehicle M may be automatically driven without a driver.

(7) The power-supplying coil K and the power-receiving coil J are not limited to a helical coil. Coils with arbitrary shape and type such as solenoid-type coils may be used so long as they make wireless power supply between the power-supplying coil K and the power-receiving coil J available. Furthermore, the two coils may be different in type, shape, and size. Also, the cross-sectional view of the movable frame body 3 when seen from above may be other than a rectangle in accordance with the shape of the power-supplying coil.

Figure 6A:
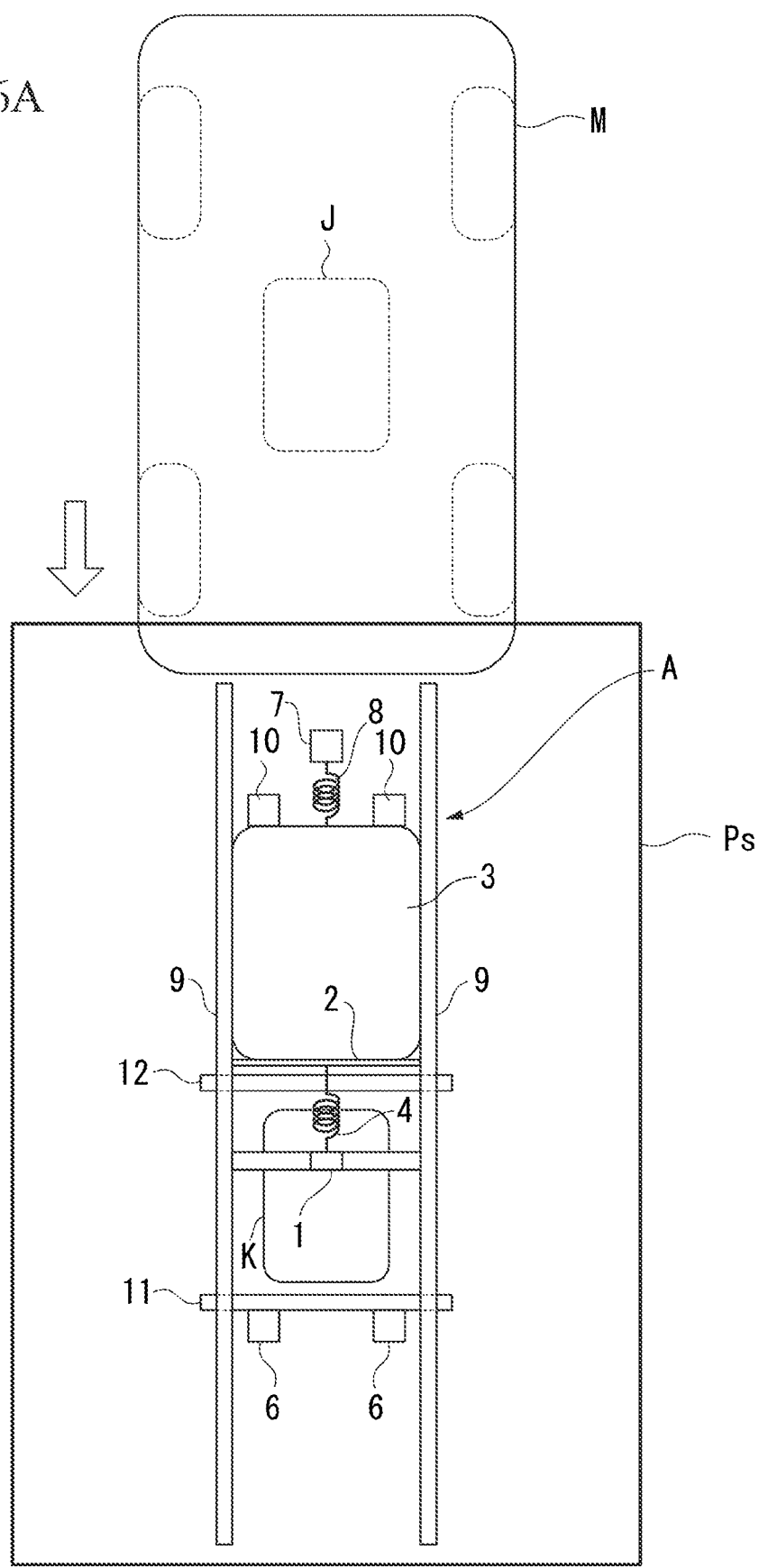
FIG. 6A is a diagram showing a variant example of the embodiment of the present invention.

(8) In the above-mentioned embodiment, the movable unit 1 is guided by the first guide rails 5, which are positioned above the power-supplying coil K, to be moved horizontally. However, the present invention is not limited to this. For example, as shown in FIG. 6A, the first guide rails 5 may be omitted, and furthermore, the ends of the second guide rails 9 on the side opposite to the entrance of the parking space Ps may be extended to cover the same length as that of the first guide rails 5, and the movable unit 1 may be guided by the second guide rails 9 to move horizontally.

Figure 6B:
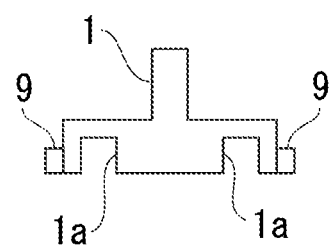
FIG. 6B is a diagram showing the variant example of the embodiment of the present invention.

FIG. 6B is a diagram of the movable unit 1 guided by the second guide rails 9, when seen in the direction opposite to the entrance of the parking space Ps. If guided by the second guide rails 9, the movable unit 1 is required to be held between the second guide rails 9. Therefore, as shown in FIG. 6B, the movable unit 1 needs to have a length that covers the distance between the pair of second guide rails 9. Furthermore, this movable unit 1 may be provided with recessed sections 1a in order to prevent a collision with the first stoppers 6 when the movable unit 1 is moved by the push from the vehicle M in the direction opposite to the entrance of the parking space Ps or when the movable unit 1 is returned to its original position by the pull from the second coil spring 8 as a result of the vehicle M exiting the parking space Ps.

Figure 7A:
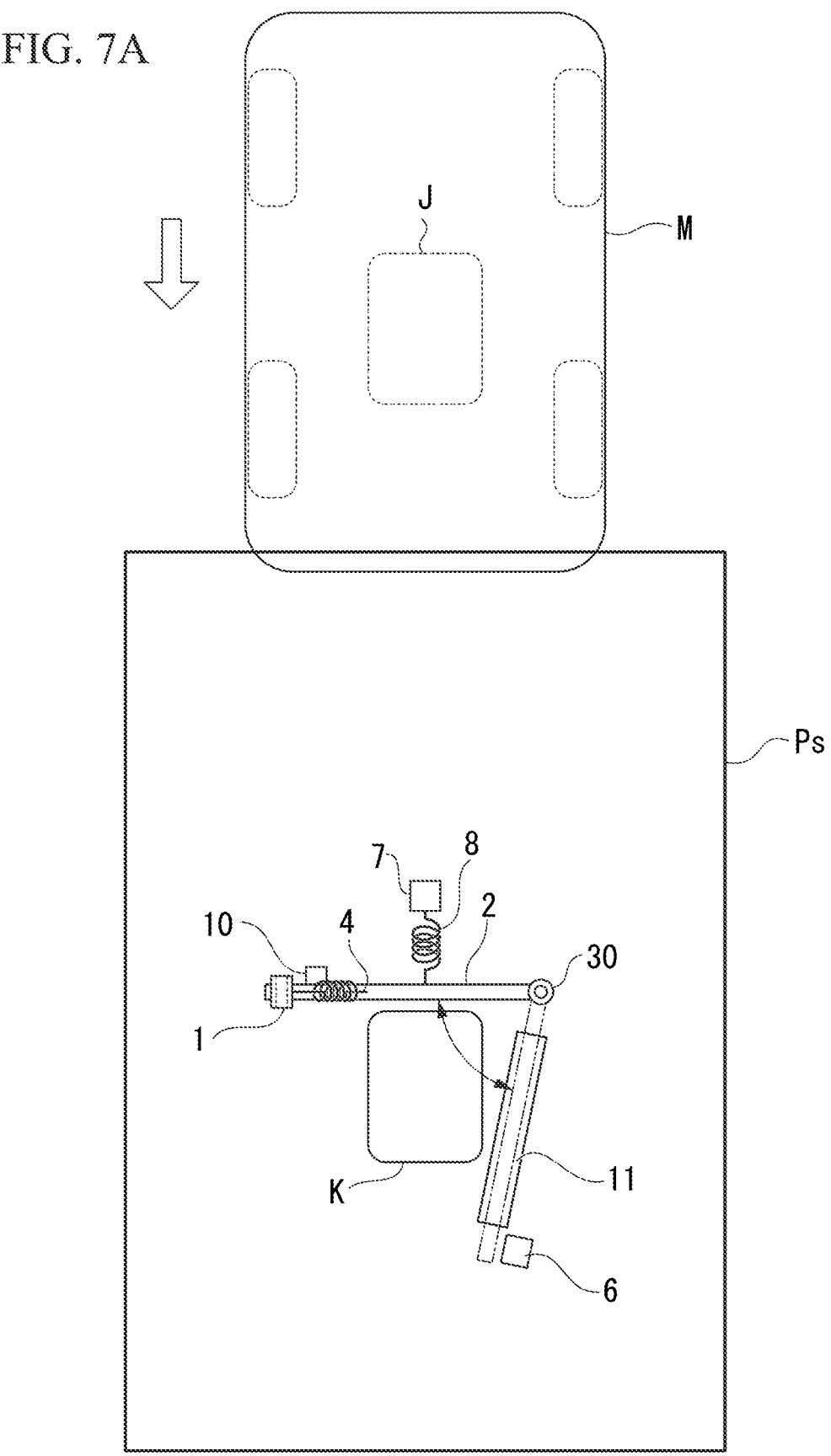
FIG. 7A is a front view of a variant example of the embodiment of the present invention.
Figure 7B:
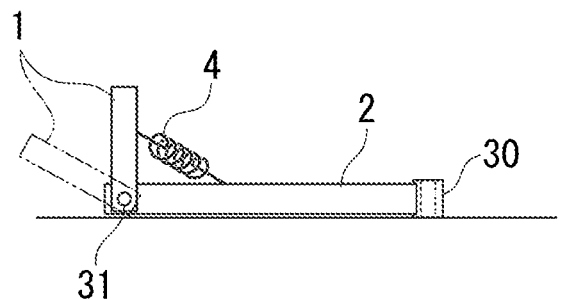
FIG. 7B is a diagram showing the variant example of the embodiment of the present invention.

(9) Other than the above-mentioned variant examples, a first end of the movable cleaning unit 2 may be rotatably supported by a vertical rotation shaft 30, and a range of rotation of the movable cleaning unit 2 may be restricted by a first stopper 6 and a second stopper 10, as shown for example in FIG. 7A and FIG. 7B. FIG. 7B is a diagram of the movable unit 1 when seen in a direction opposite to the entrance of the parking space Ps. In FIG. 7B, the movable unit 1 is supported by a horizontal shaft 31 provided on the second end of the movable cleaning unit 2 and is rotatable about the horizontal shaft 31 with respect to the movable cleaning unit 2. Furthermore, the second end of the second coil spring 8 is fixed to a central portion of the movable cleaning unit 2. Note that the first coil spring 4 has stiffness greater than that of the second coil spring 8.

Figure 8A:
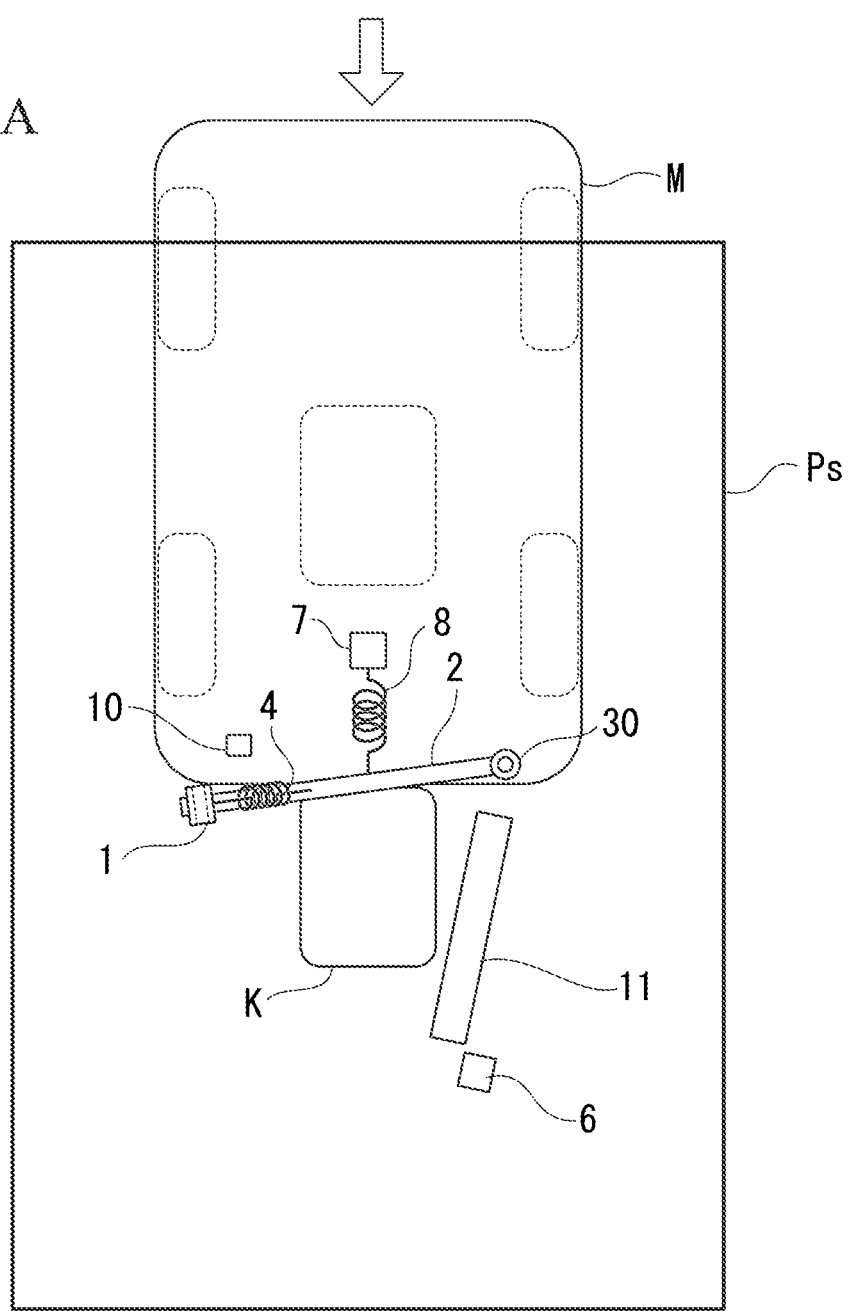
FIG. 8A is a diagram showing the variant example of the embodiment of the present invention.
Figure 8B:
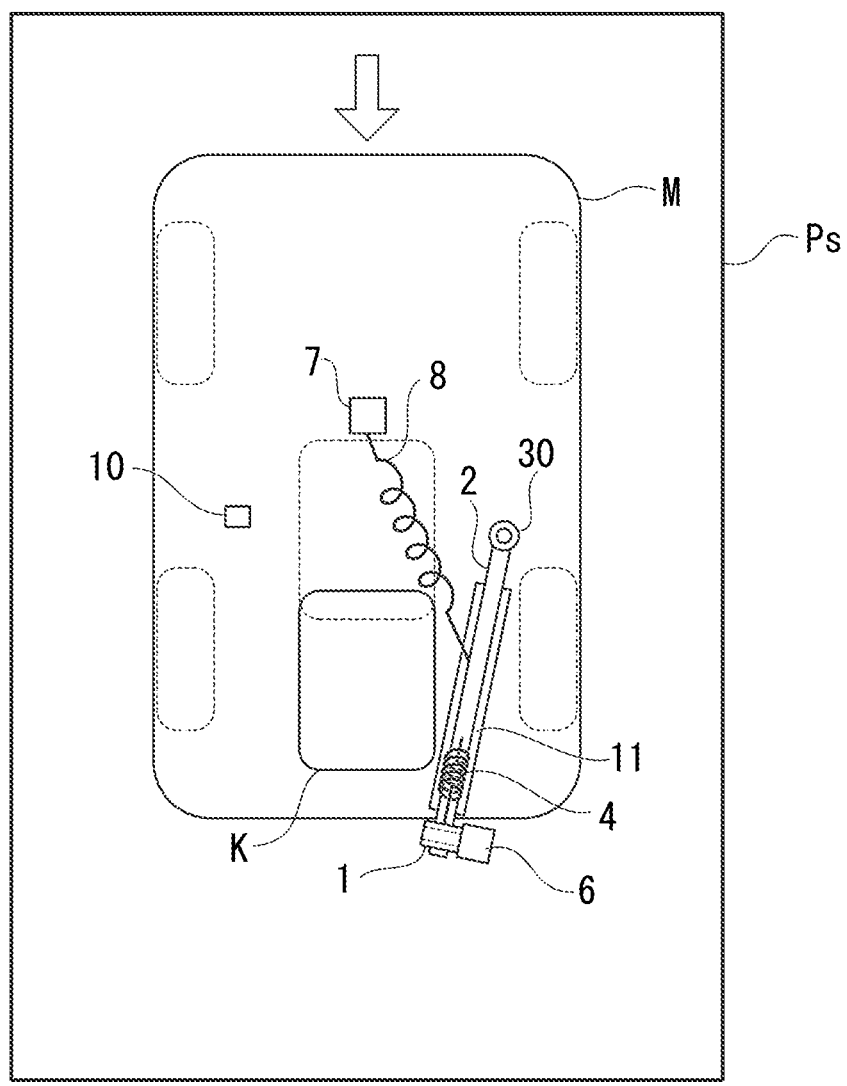
FIG. 8B is a diagram showing the variant example of the embodiment of the present invention.
Figure 8C:
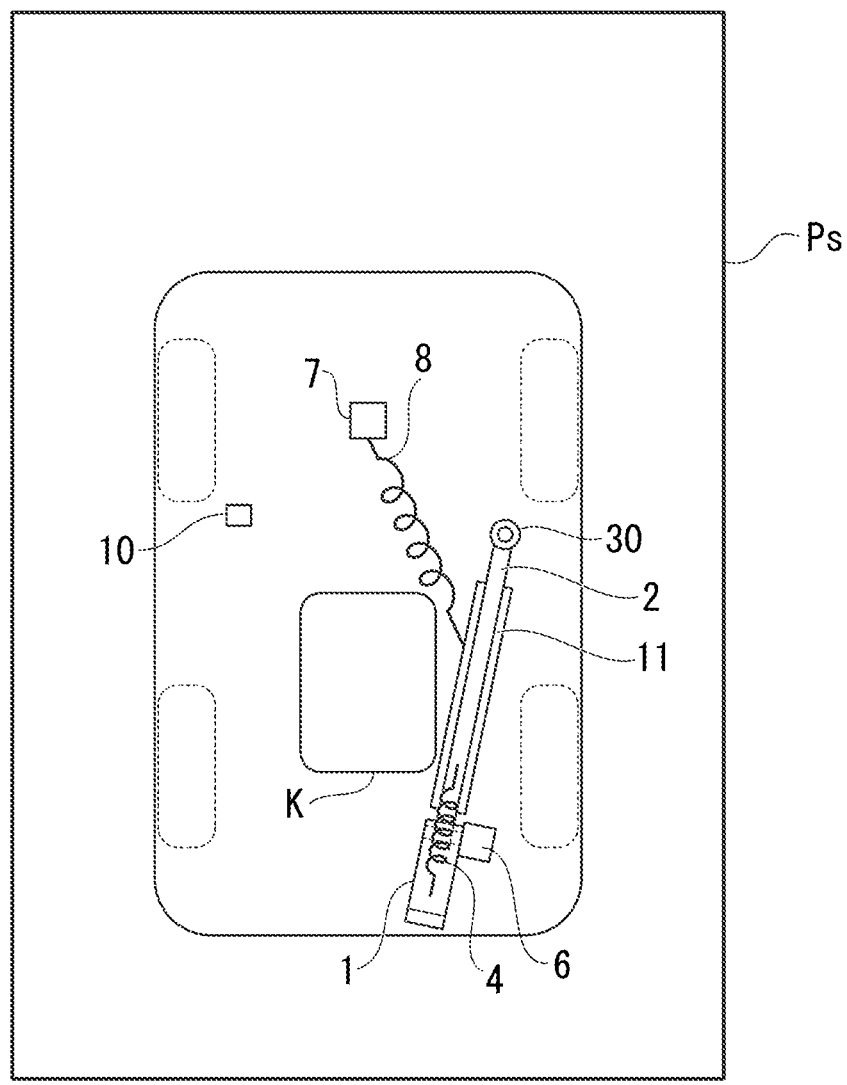
FIG. 8C is a diagram showing the variant example of the embodiment of the present invention.

Hereunder, a description of a process is given in which the vehicle M enters and parks in the parking space Ps when the variant example shown in FIG. 7A is used, with reference to FIG. 8A, FIG. 8B, and FIG. 8C. As shown in FIG. 8A, when the vehicle M enters the parking space Ps, the movable unit 1 is moved by the push from the vehicle M. This causes the movable cleaning unit 2 coupled to the movable unit 1 to rotate about the vertical rotation shaft 30, to thereby eliminate foreign matter on the power-supplying coil K. Then, as shown in FIG. 8B, when the vehicle M enters the parking space Ps further, the foreign matter eliminated by the movable cleaning unit 2 falls into the first foreign matter receiving ditch 11, and then the movable cleaning unit 2 hits the first stopper 6. When the vehicle M enters the parking space Ps still further to be located at a position where wireless power supply is available, namely, when the power-receiving coil J of the vehicle M is above the power-supplying coil K as shown in FIG. 8C then the movable unit 1 falls to the ground and goes under the vehicle M. When the wireless power supply is completed and the vehicle M is moving away from the parking space Ps, the movable unit 1 is returned to its erect state due to the restoring force of the first coil spring 4. When the vehicle M is moving further away from the parking space Ps, the movable cleaning unit 2 is returned to a position where the movable cleaning unit 2 hits the second stopper 10 due to the restoring force of the second coil spring 8.

INDUSTRIAL APPLICABILITY

A foreign matter removal mechanism is provided that is capable of removing foreign matter and that makes it unnecessary to provide a drive source that generates a vibration such as a motor.

DESCRIPTION OF REFERENCE SIGNS

A: foreign matter removal mechanism
1: movable unit
2: movable cleaning unit
3: movable frame body
4: first coil spring
5: first guide rail
6: first stopper
7: spring fixation unit
8: second coil spring
9: second guide rail
10: second stopper
11: first foreign matter receiving ditch
12: second foreign matter receiving ditch
1*a*: recessed section

The invention claimed is:
1. A foreign matter removal mechanism for removing foreign matter on a power-supplying coil that wirelessly supplies power to a parked vehicle from below, comprising:
 a movable unit that has a height so as to contact the vehicle and is pushed by the vehicle to move horizontally; and
 a movable cleaning unit that is coupled to the movable unit and moves, in conjunction with a movement of the movable unit, along an upper surface of the power-supplying coil.
2. The foreign matter removal mechanism according to claim 1, comprising
 a foreign matter receiving ditch that is provided on a far side of the power-supplying coil in a moving direction of the movable cleaning unit.
3. The foreign matter removal mechanism according to claim 1, comprising:
 a movable frame body that is fixed to the movable cleaning unit from an opposite side of the movable unit and moves, in conjunction with the movement of the movable unit, along a parking surface on which the vehicle is parked; and
 a second foreign matter receiving ditch that is provided on a near side of the power-supplying coil in the moving direction of the movable cleaning unit.
4. The foreign matter removal mechanism according to claim 1, comprising
 a stopper provided on the far side of the power-supplying coil in the moving direction of the movable cleaning unit.
5. The foreign matter removal mechanism according to claim 1, comprising
 a coil spring that connects between the movable unit and the movable cleaning unit.
6. The foreign matter removal mechanism according to claim 1, comprising:
 a second stopper that is provided on the near side of the power-supplying coil in the moving direction of the movable cleaning unit; and
 a second coil spring that biases the movable cleaning unit in a direction opposite to the moving direction of the movable cleaning unit.

* * * * *